(12) United States Patent
Klausberger et al.

(10) Patent No.: US 8,064,751 B2
(45) Date of Patent: Nov. 22, 2011

(54) APPLIANCE-GUIDED EDIT-OPERATIONS IN ADVANCED DIGITAL VIDEO RECORDING SYSTEMS

(75) Inventors: Wolfgang Klausberger, Hannover (DE); Stefan Kubsch, Hohnhorst (DE); Ralf Ostermann, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 689 days.

(21) Appl. No.: 10/513,233

(22) PCT Filed: Apr. 25, 2003

(86) PCT No.: PCT/EP03/04310
§ 371 (c)(1),
(2), (4) Date: Nov. 2, 2004

(87) PCT Pub. No.: WO03/096349
PCT Pub. Date: Nov. 20, 2003

(65) Prior Publication Data
US 2005/0229225 A1    Oct. 13, 2005

(30) Foreign Application Priority Data

May 8, 2002   (EP) .................................. 02010390

(51) Int. Cl.
*H04N 5/93* (2006.01)

(52) U.S. Cl. .......... 386/292; 386/213; 386/248; 725/50; 725/151; 725/152; 348/460

(58) Field of Classification Search ............ 386/46, 386/81, 95, 96, 111, 83, 52, 124–126, 213, 386/248, 291, 292; 725/38, 61, 134, 142, 725/50, 133, 141, 151–153; 348/515, 460, 348/552; 345/783, 845

See application file for complete search history.

(56) References Cited

U.S. PATENT DOCUMENTS

| | | | | |
|---|---|---|---|---|
| 5,963,264 A | * | 10/1999 | Jackson | 348/460 |
| 6,185,360 B1 | * | 2/2001 | Inoue et al. | 386/46 |
| 6,208,800 B1 | * | 3/2001 | Katsuyama et al. | 386/83 |
| 6,243,142 B1 | * | 6/2001 | Mugura et al. | 348/564 |

(Continued)

FOREIGN PATENT DOCUMENTS

EP    1003304    5/2000

(Continued)

OTHER PUBLICATIONS

Pfeiffer S et al: "TV Anytime as an Application Scenario for MPEG-7" Proceedings ACM Multimedia 2000 Workshops, Marian Del Rey, CA, Nov. 4, 2000, ACM Int'l Multimedia Conf., New York, NY, Conf. 8, pp. 89-92.

(Continued)

*Primary Examiner* — Thai Tran
*Assistant Examiner* — Mishawn Dunn
(74) *Attorney, Agent, or Firm* — Robert D. Shedd; Robert D. Levy

(57) ABSTRACT

The invention comprises an application for recording and the playback of MPEG-2 transport-streams transmitted via DVB-systems with optical discs. Apart from audio- and video-signals, additional information (which describe the content of the DVB-multiplex) will also be transmitted in DVB-SI descriptors. These descriptors correspond to the incoming transport-stream-packets and can be used for comfortable features, like event-triggered start of a recording or automatic generation of play-lists.

9 Claims, 1 Drawing Sheet

U.S. PATENT DOCUMENTS

Figure 1:
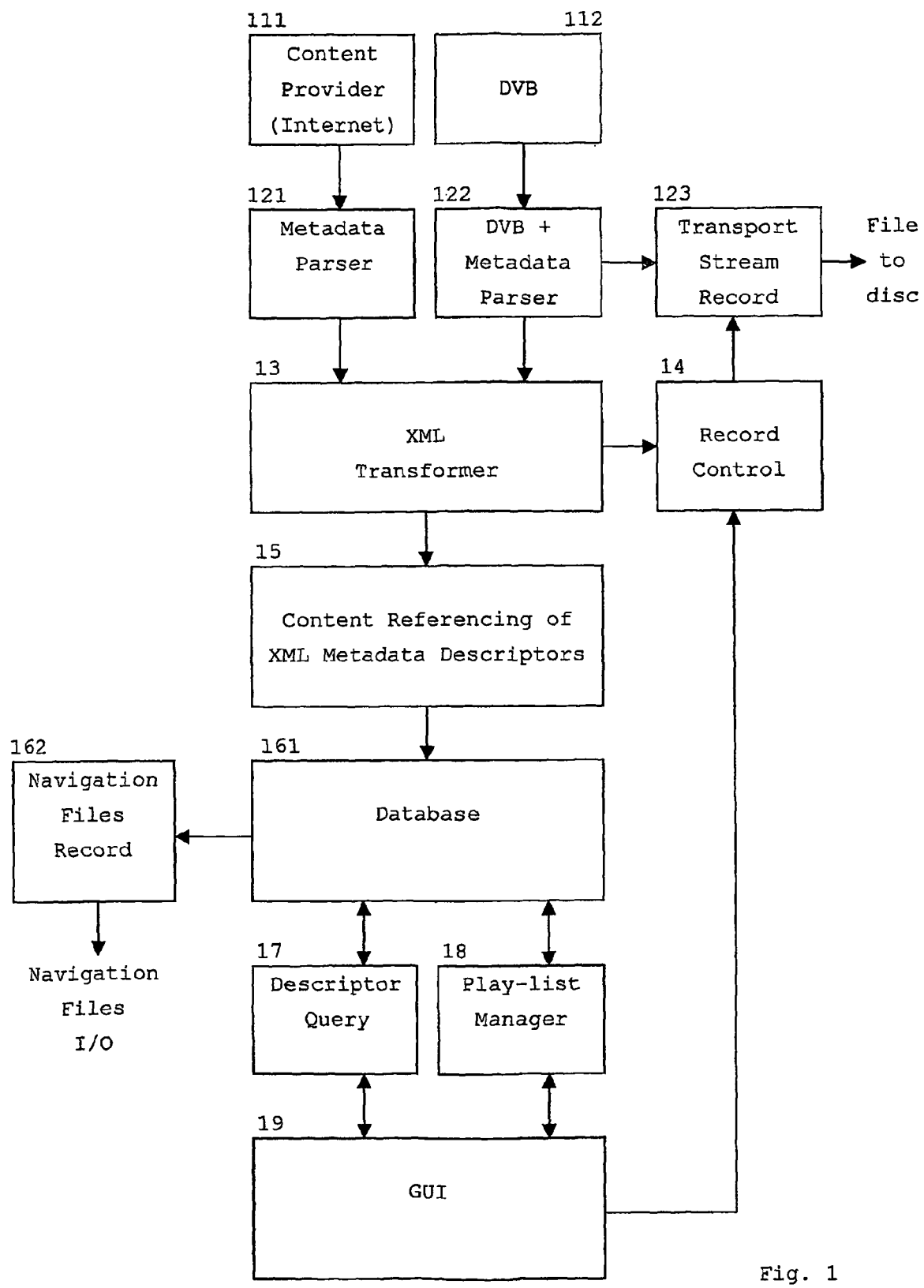

| | | | |
|---|---|---|---|
| 6,252,629 B1 * | 6/2001 | Takatori | 348/460 |
| 6,344,878 B1 * | 2/2002 | Emura | 348/460 |
| 6,771,885 B1 * | 8/2004 | Agnihotri et al. | 386/83 |
| 6,951,031 B2 * | 9/2005 | Hatano | 725/50 |
| 7,003,213 B1 * | 2/2006 | Hasegawa | 386/83 |
| 7,203,952 B2 * | 4/2007 | Broadus | 725/40 |
| 7,236,687 B2 * | 6/2007 | Kato et al. | 386/95 |
| 2001/0014210 A1 | 8/2001 | Kang | |
| 2003/0093790 A1 * | 5/2003 | Logan et al. | 725/38 |

FOREIGN PATENT DOCUMENTS

| | | |
|---|---|---|
| EP | 1021048 | 7/2000 |
| EP | 1103974 | 5/2001 |
| EP | 1198133 | 4/2002 |
| EP | 1271523 | 1/2003 |
| JP | 10/013756 | 1/1998 |
| JP | 2000-123440 * | 4/2000 |
| JP | 2000/298603 | 10/2000 |
| JP | 2001/045418 | 2/2001 |
| JP | 2001/238176 | 8/2001 |
| JP | 2002/112155 | 4/2002 |
| WO | WO 00/14744 | 3/2000 |

OTHER PUBLICATIONS

IST-1999-11702: myTV—personalised services for digital television, Final Report, Mar. 2002, pp. 1-23.

Ceccarelli M. et al: "Home multimedia systems: on personal video libraries" Multimedia Computing and Systems, 1999, IEEE Int'l Conference on Florence, Italy, Jun. 7-11, 1999, Los Alamitos, CA, IEEE Comput. Soc. US, pp. 1082-1085.

Search Report Dated Jun. 23, 2003.

* cited by examiner

APPLIANCE-GUIDED EDIT-OPERATIONS IN ADVANCED DIGITAL VIDEO RECORDING SYSTEMS

This application claims the benefit, under 35 U.S.C. §365 of International Application PCT/EP03/04310, filed Apr. 25, 2003, which was published in accordance with PCT Article 21(2) on Nov. 20, 2003 in English and which claims the benefit of European patent application No. 02010390.9, filed May 8, 2002.

The invention provides a method and an apparatus to use signals sent by a broadcast-system for recording and editing a data-stream, the broadcast signals including metadata.

BACKGROUND

The terms "Metadata" and "Essence" are defined as following: Metadata are data consisting of essence and of one-or-more links. In the semantic sense, these links describe a link between the essence and other content and can be of different kinds (e.g. an HTML-Link).

Essence consists of any data. These data can contain none, one, or more metadata (e.g. the essence of metadata can contain other metadata; also essence can consist of data, which do not contain any metadata).

Increased capacities for DVD and DVR-discs will provide the storage of much more movies on one disc than it is possible today. Broadcast-systems like DVB do not only transmit pure essence, but also descriptions about that essence, the so called metadata. This metadata contains all kind of content-information and allows the navigation through the essence.

VPS is a well-known invention for starting and stopping an analog video-recorder at a certain time. This information is being sent by the broadcaster of analog TV-systems in the Vertical Blanking Intervall (VBI). This principle is not supported by the DVB standard, because the performance of timer controlled recording was planned by EPG mechanisms.

Prior art only deals with the principles of DVB-related recording media. EP-A-1 103 974 describes a method and an apparatus for recording and reproduction, whereas the principles of starting and stopping a DVB-recorder are not taught.

INVENTION

The invention relates to starting and stopping a DVB-recorder, wherein defined signals have to be used. The evaluation and storage of said metadata can be used for new comfortable features for the recording on optical discs.

The following abbreviations are being used in this invention:
DVB-SI: Digital Video Broadcast Service Information
SPN: Source Packet Number
PTS: Presentation TimeStamp
EIT: Event Information Table
CRID: Content Reference ID
EP: Entry Point The structure of a digital recording/reproduction device consists of at least one play-list (i.e. a real play-list or a virtual play-list) and a corresponding clip-information-file.

The play-list describes the play-items of a recorded stream and the points to the in- and out-time positions. The clip-information-file contains also a list of entry-points, which will be extracted from the incoming DVB-video- or DVB-audio-stream-packets. These entry-points lead to stream-packet-positions, where the decoding process can start (I-frame positions).

The entry-point-packets are:
I-frame-positions for video,
Frame-start for audio.
They are indicated by a source-packet-number (SPN) and registered in the EP-map with a corresponding presentation timestamp (PTS).

As it is not possible to apply the principles of VPS (Video Programming Service) for the DVB concept, except the use of EPG mechanisms, a new solution was created, which analyses the stream of a DVB-system. Exact timer-signals can be generated for the start-time and the end-time. Also, event-controlled recording can be generated, furthermore play-lists can be automatically generated, and easy edit operations are feasible.

Descriptions (metadata) about these video- and audio-streams are being transmitted in DVB-SI packets.

The processing of DVB-transport-streams is the following: The incoming DVB-transport-stream is being parsed and the essence stored on the disc. The corresponding metadata of DVB-SI (service information) and teletext are extracted and afterwards converted into an XML-descriptor-stream. These can be hereafter stored in a database, which is located e.g. in the recording device. Additional metadata can be received from the Internet, from TV-Anytime-documents, metadata can also be self made, etc. The extracted DVB-SI-metadata can be used during the recording-process and also afterwards in order to ease the user-operations.

The most important metadata in this invention are transmitted in the DVB-SI event-information-section of the actual transport-stream with the present/following event-information-table (EIT). They provide information about the start-time, the duration, the running-status etc. Extended EIT-descriptors provide information about the title, the language, etc.

The states of running-status are "not running", "starts in a few seconds" and "running", they represent the status of an event, the status of the program.

Depending on the chosen strategy, the transition from one running-status to another (e.g. from "starts in a few seconds" to "running") can be used as a trigger-event to start a recording or to create a play-list. The occurrence of this event within the recorded stream can be identified by a Source Packet Number (SPN). After marking the position of the event, the next PTS, which represents an I-Frame, will be used as the IN_time for the PlayItem.

In order to schedule changes of an event, the DVB standard defines a mechanism to override the running-status of selected events, which are signaled in the Running Status Table (RST).

If the running-status of a current recording is overridden, the new running-status will be used instead of the former running-status.

A problem to be solved by the invention is to find the start-time and the end-time of specific program-items.

This problem is solved by the method disclosed in claim 1 and by the apparatus disclosed in claim 8.

In principle, the inventive method is suited for generating exact timer signals as well as event-controlled recordings: Metadata descriptors are analyzed by runtime or by a resident metadata-archive stored in a digital recorder, characterized in that a resident metadata-archive will contain and update the metadata, wherein following steps are included:
data-streams including metadata are being received and parsed, wherein the metadata are originated from Content, e.g. Internet and/or from DVB-data, e.g. DVB transport stream;

metadata originated from Content and metadata originated from DVB are parsed;

said metadata are being transformed into XML-metadata-descriptors;

transformed metadata are being used to control a transport stream record and to reference the content of the XML-metadata-descriptors;

at least some of said metadata-descriptors are stored into a database, e.g. a DBMS-database;

the metadata-archive is accessed by a query and a browsing mechanism via a graphical user interface;

the graphical user interface organizes and structures the editing mechanism, which is the play-list manager, and the record control;

recording the transport stream on a storage medium, e.g. a disc;

recording the navigation files from the DBMS-database on a storage medium, e.g. a disc.

Then, the metadata descriptors are analyzed by runtime or by a resident metadata-archive stored in a digital recorder, the apparatus including:

means to receive and to parse data-streams including metadata from Content, e.g. from Internet and/or means to receive and to parse data-streams from DVB-data, e.g. DVB-transport streams;

means to transform said metadata into XML-metadata-descriptors;

means to control a transport stream record and means to reference the content of the XML-metadata-descriptors;

means to store at least some of said metadata-descriptors into a database, e.g. a DBMS-database;

means to provide access to a metadata-archive with the help of a query and browsing mechanism via a graphical user interface;

means to organize and structure the editing mechanism and the record control means;

means to record the transport stream on a storage medium, e.g. a disc;

means to record the navigation files from the DBMS-database on a storage medium, e.g. a disc.

The invention can also be used at the procedure of generating play-lists and enabling easy edit operations. Also, event-controlled recording can be generated, and easy edit operations are feasible.

Advantageous additional embodiments of the invention are disclosed in the respective dependent claims.

DRAWING

Exemplary embodiments of the invention are described with reference to the accompanying drawing, which show in:

FIG. 1 Simple Block Diagram of the Invention.

EXEMPLARY EMBODIMENTS

FIG. 1 shows the principle of the invention. First, data originated from a Content Provider (e.g. from the Internet) 111 or from a DVB-source 112 are received. In the second step the received data are being parsed 121, 122. The data originated from a DVB-source are being parsed 122 and can be diverted to a transport stream recording device 123, which will file these parsed DVB-data to a storage medium. The parsed data are then led to an XML-Transformer 13, which will control the Record Control 14 and make the Content Referencing of the XML-Metadata-Descriptors 15. These data are being saved in a database 161, which is in interaction with a Descriptor Query 17 and a Play-List Manager 18. The Navigation Files from the Database 161 are recorded in a Navigation File Record device 162. A GUI 19 will output the data originated from the Descriptor Query 17 and from the Play-List Manager 18. Through the GUI 19 the user is able to manipulate the Record Control 14, which will enable the Transport Stream Record 123 to record the adequate data. These data are hereafter saved to above said storage medium. The purpose of the invention is to provide an application for recording and playback of MPEG-2 transport-streams transmitted via DVB-systems onto optical discs.

Embodiment 1

While metadata-descriptors (extracted from the DVB-SI) 112 are being parsed and analysed 122, information will be used for generating trigger-signals 14, e.g. starting-events and ending-events.

The timer-controlled recording can be activated, e.g. by a "record-next-event"-button, i.e. wherein the next program can be recorded, with given program-data (e.g. time, duration, channel, etc.).

Embodiment 2

Automatic generating of play-lists during the recording-process: A process for automatic generating of a play-list waits for EIT-events and evaluates the running-status of the latest EIT for the selected service.

The name of the play-list can be taken from the title of the event, which will be transmitted in the "short_event_descriptor" of the EIT-table.

Embodiment 3

TV-Anytime has defined a Content Reference ID (CRID), which allows to identify uniquely TV-content.

If the CRID of a recording is known in advance and the CRID is re-transmitted periodically with/within the A/V content, the CRID can be used to generate the same trigger-events (start, end, cut points, etc.) as mentioned in embodiment 1. Together with the trigger-events from embodiment 1, the precision can be therefore enhanced.

Embodiment 4

The automatic generation or modification of a play-list can be also done offline, after the recording process is finished, because all the relevant metadata are being stored in the database.

Embodiment 5

An easy-editing process for recording can be implemented, owing to the stored metadata. With the help of DVB-SI event-information (EIT, RST) the recording device can suggest cut-points to the user.

The following edit-operations can be performed by the digital recording/reproduction device:

Starting-points and ending-points of a movie, which are needed to delete unwanted fragments of unwanted movies;

Starting-points and ending-points of a movie, which are needed to separate movies recorded in one take. A possible result for DVR can be a RealPlayList per movie.

Starting-point and ending-point of a movie, needed to check if a movie has been entirely recorded.

The invention claimed is:

1. Method for analyzing metadata in a digital video recorder, comprising the steps:
   receiving a digital television signal including metadata specifying service information, said service information including information about at least one of (1) the running status of a present program and/or (2) the running status of the program following the present program;
   extracting said status information from the received digital television signal; and
   generating start-time and/or end-time information for a program to be, being or having been recorded based on a change of said extracted running status information and without user intervention, where the running status indicates one of running, not-running, and starting soon.

2. Method according to claim 1, wherein said generated start-time and/or end-time is used for controlling a recording of a program.

3. Method according to claim 1, wherein said generated start-time and/or end-time is used for generating a play-list of recorded programs.

4. Method according to claim 3, wherein said play-list is generated during recording the program.

5. Method according to claim 3, wherein metadata specifying the service information for the recorded programs is stored in a database and said play-list is generated or modified after finishing a recording.

6. Method according to claim 1, wherein said generated start-time and/or end-time is used for editing a recorded program.

7. Method according to claim 1, said metadata specifying service information having DVB-SI format and said running status information being included in the Event Information Table specified in the DVB-SI standard.

8. Method according to claim 1 further comprising transforming at least part of said extracted metadata into XML metadata descriptors; and
   storing said XML metadata descriptors in a database.

9. Digital video recorder, including the following means for analyzing metadata:
   means for receiving a digital signal including metadata specifying service information, said service information including information about at least one of (1) the running status of a present program and/or (2) the running status of the program following the present program;
   means for extracting said status information from the received digital television signal; and
   means for generating start-time and/or end-time information for a program to be, being or having been recorded based on a change of said running extracted status information, and without user intervention, where the running status indicates one of running, not-running, and starting soon.

* * * * *